(12) United States Patent
Winkler et al.

(10) Patent No.: US 12,128,954 B2
(45) Date of Patent: Oct. 29, 2024

(54) HOOD FOR A VEHICLE

(71) Applicant: Volkswagen Aktiengesellschaft, Wolfsburg (DE)

(72) Inventors: Joachim Winkler, Denkte (DE); Holger Olschewski, Braunschweig (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 347 days.

(21) Appl. No.: 17/383,011

(22) Filed: Jul. 22, 2021

(65) Prior Publication Data

US 2021/0347414 A1 Nov. 11, 2021

Related U.S. Application Data

(63) Continuation of application No. PCT/EP2020/050963, filed on Jan. 16, 2020.

(30) Foreign Application Priority Data

Jan. 23, 2019 (DE) ...................... 10 2019 200 765.1

(51) Int. Cl.
 B62D 25/10 (2006.01)
 B60R 21/34 (2011.01)
 (Continued)

(52) U.S. Cl.
 CPC ............ B62D 25/105 (2013.01); B60R 21/34 (2013.01); B62D 25/12 (2013.01); E05B 83/24 (2013.01); *B60R 2021/343* (2013.01)

(58) Field of Classification Search
 CPC ...... B62D 25/105; B62D 25/12; B60R 21/34; B60R 2021/343; E05B 83/24; E05B 77/08
 See application file for complete search history.

(56) References Cited

U.S. PATENT DOCUMENTS 3,733,958 A * 5/1973 Willey ................ F16B 19/1027
 411/908
3,876,246 A * 4/1975 Lutz .................... B60R 13/0212
 296/214

(Continued)

FOREIGN PATENT DOCUMENTS

CN 101626924 A 1/2010
CN 201999075 U * 10/2011 ............. B60R 21/34

(Continued)

*Primary Examiner* — James A Shriver, II
*Assistant Examiner* — Michael T. Walsh
(74) *Attorney, Agent, or Firm* — Muncy, Geissler, Olds & Lowe, P.C.

(57) ABSTRACT

A hood for a vehicle having a latch support bar that extends transversely to the longitudinal direction of the vehicle. The latch support bar is arranged on the inner side of the hood in the front region in the direction of travel. The latch support bar is arranged symmetrically with respect to the outer skin of the hood. The latch support bar has a latch element. The latch element produces a detachable connection of the hood to the vehicle, which can be detached by an operating element. The latch support bar is connected to the hood at a minimum of two fastening points spaced as far apart from one another as possible in order to reliably absorb lateral applications of force. In this way, reliable retention of the hood is advantageously ensured.

13 Claims, 2 Drawing Sheets

(51) Int. Cl.
  *B62D 25/12* (2006.01)
  *E05B 83/24* (2014.01)

(56) References Cited

U.S. PATENT DOCUMENTS

| | | | | |
|---|---|---|---|---|
| 4,490,083 A | * | 12/1984 | Rebish | F16B 37/122 411/338 |
| 6,810,978 B2 | * | 11/2004 | Bivens | B62D 21/09 296/193.11 |
| 8,118,352 B2 | | 2/2012 | Rocheblave et al. | |
| 8,931,814 B2 | | 1/2015 | Mildner | |
| 2019/0162222 A1 | * | 5/2019 | Vovan | F16B 5/02 |

FOREIGN PATENT DOCUMENTS

| | | | | |
|---|---|---|---|---|
| CN | 102673655 A | | 9/2012 | |
| CN | 103029675 A | * | 4/2013 | ............ B60R 21/38 |
| CN | 211568079 U | * | 9/2020 | |
| DE | 3035352 A1 | | 5/1982 | |
| DE | 19911833 A1 | | 9/1999 | |
| DE | 10331845 A1 | | 2/2005 | |
| DE | 102004009470 A1 | * | 9/2005 | ............ B60R 21/34 |
| DE | 102012012108 A1 | * | 12/2013 | ............ B60R 19/34 |
| DE | 202013105718 U1 | * | 4/2014 | .......... B60Q 1/0491 |
| DE | 102014003199 A1 | | 9/2015 | |
| DE | 102014018066 A1 | * | 6/2016 | ............ B60R 21/34 |
| DE | 102018103846 A1 | | 8/2018 | |
| EP | 1504985 A1 | * | 2/2005 | ......... B60R 13/0838 |
| EP | 1557340 A1 | * | 7/2005 | ............ B60R 21/34 |
| EP | 1826455 B1 | * | 1/2014 | ............ F16F 13/007 |
| EP | 3210859 A1 | | 8/2017 | |
| GB | 2547790 A | * | 8/2017 | ............ B60R 21/38 |
| JP | H11321714 A | | 11/1999 | |
| JP | 2002037129 A | | 2/2002 | |
| JP | 2004067006 A | * | 3/2004 | ............ B60R 21/34 |
| JP | 2007022204 A | | 2/2007 | |
| JP | 2007030737 A | | 2/2007 | |
| JP | 2013014198 A | * | 1/2013 | ............ B60R 21/34 |
| JP | 7232730 B2 | * | 3/2023 | |
| KR | 20020039757 A | * | 5/2002 | |
| WO | WO2008062143 A2 | | 5/2008 | |
| WO | WO-2009048043 A1 | * | 4/2009 | ............ B60R 21/34 |
| WO | WO-2011118016 A1 | * | 9/2011 | ............ B60R 21/34 |

* cited by examiner

HOOD FOR A VEHICLE

This nonprovisional application is a continuation of International Application No. PCT/EP2020/050963, which was filed on Jan. 16, 2020 and which claims priority to German Patent Application No. 10 2019 200 765.1, which was filed in Germany on Jan. 23, 2019 and which are both herein incorporated by reference.

BACKGROUND OF THE INVENTION

Field of the Invention

The present invention relates to a hood for a vehicle.

Description of the Background Art

Pedestrian protection is playing an increasingly important role in vehicle development. This also leads to increased requirements on the design of hoods for motor vehicles. Thus, in addition to the known requirements based on wind loads, slamming, and the prevention of hood flutter, hoods must now also absorb the energy of a pedestrian impact in the region of the latch located in the front, and protect the pedestrian.

Systems are known that raise the hood in the event of a pedestrian impact in order to thus create a crumple zone to absorb the impact energy of the pedestrian. Furthermore, it is known to use a windshield airbag, which covers the region of the windshield and the A-pillar, in order to protect the pedestrian's head from a collision with these regions in the event of a frontal pedestrian accident. These measures are very cost-intensive, and, moreover, they disadvantageously require maintenance and functional monitoring as active components.

In DE 10 2014 003 199 A1, a hood for a vehicle is proposed that has an outer frame and a centrally arranged opening in this frame. The centrally arranged opening in the frame is spanned by cross-members in this design.

In DE 199 11 833 A1, a front end region of a motor vehicle is introduced that is intended to improve pedestrian protection. For this purpose, the components located there, among them the hood, are mounted by means of shock absorbing elements so as to be able to absorb impact energy.

SUMMARY OF THE INVENTION

It is therefore an object of the present invention to provide a hood for vehicles that ensures a high level of pedestrian protection, is simple and economical to manufacture, and has a low probability of failure.

A hood of a vehicle has an outer skin, generally with reinforcing elements arranged on the inner side. These elements often are integrally connected to the outer skin. The reinforcing elements stiffen the outer skin and are intended to prevent bending of the hood under wind loads as well as flutter due to dynamic excitation.

Equally relevant load cases are the opening and closing of the hood as well as wind loads in the open state. In particular, torsional loads, which arise as a result of a lateral application of force to the hood for opening or closing, for example, must also be taken into account here. These factors argue for the stiffest possible design of the hood.

On the other hand, pedestrian protection is enhanced by a soft design of the hood.

The hood according to the invention for a vehicle has a latch support bar. This bar extends transversely to the longitudinal direction of the vehicle and is arranged on the inside of the hood. Preferably, the latch support bar is arranged on the inner side of the hood in the front region in the direction of travel. Especially preferably, the latch support bar is arranged symmetrically with respect to the outer skin of the hood.

For the purpose of clarity, it is noted that the inner side is the side of the hood facing the passenger compartment, which is to say the side facing the engine in the case of an engine hood, for example.

The latch support bar can have a latch element. The latch element produces a detachable connection of the hood to the vehicle, which can be detached by an operating element.

The latch support bar can be connected to the hood at a minimum of two fastening points in this case. The fastening points are spaced as far apart from one another as possible in order to reliably absorb lateral applications of force. In this way, reliable retention of the hood is advantageously ensured. The connection of the latch support bar is preferably accomplished in this design with the reinforcing elements of the hood, since good application of force to the hood is advantageously ensured in this way. It can also be accomplished with the outer skin of the hood, however.

Advantageously, an additional crumple zone can be created as pedestrian protection by means of the use of a latch support bar. Especially advantageously, this crumple zone is arranged in the region that is especially relevant for pedestrian protection.

The at least two fastening points can have a distance of at least one quarter, further preferred of at least one third, and especially preferred of at least half of the total width of the hood. Reliable retention, in particular reliable absorption of torsional loads, of the hood can advantageously be ensured in this way.

The spacing of the at least two fasteners advantageously permits a softer design of the outer skin and reinforcing elements in the region between them. The space between the two fasteners 3 and spanning the longitudinal length of the hood is defined as the latch support bar region. As a result, an additional crumple zone can be created in this region that is highly relevant for pedestrian collisions.

The outer skin, the reinforcing elements, and/or the latch support bar can be designed such that a distance between the outer skin or reinforcing elements and the latch support bar is produced in at least part of the region between the fastening points. This distance advantageously serves as an additional crumple zone and permits a homogeneous absorption of force through deformation of the outer skin without the latch support bar disrupting the deformation of the outer skin. Advantageously, the pedestrian protection can be further improved in this way.

The latch support bar in this design can be an elongated, beam-like component, which is capable of transmitting forces between the fastening points and the latch element. In this case, the latch support bar is preferably as flat as possible in order to accommodate the limited space between the hood and, e.g., vehicle technical equipment or a trunk located below it. In a preferred embodiment, the latch support bar has a U-shaped or trough-shaped cross-section. In this case, the latch support bar is connected at its end regions to the hood so that a distance between the hood and the latch support bar is produced in the middle region, which represents a crumple zone for pedestrian protection.

The latch support bar can also be a planar element, which is connected to the outer skin or the reinforcing elements at more than two fastening points.

The latch support bar can have at least one predetermined breaking point. This predetermined breaking point results in a breaking of the latch support bar at a specific load, and thus advantageously permits a "dipping" of the hood in the event of a collision. The hood can thus advantageously dip by the distance created by the latch support bar, thereby absorbing the energy of a pedestrian impact.

The latch support bar can have snubbers for the connection with the vehicle. These snubbers represent support points for the hood in the closed state so that the hood is advantageously anchored in an immovable manner, and dynamic excitation do not lead to flutter.

The latch support bar can be made of steel. Steel is advantageously cost-effective. In an alternative embodiment, the latch support bar can also be made of plastic, in particular fiber-reinforced plastic. In addition to an advantageously low weight, the properties of plastic components can also be adjusted in an outstanding manner.

The connection of the latch support bar to the hood can be accomplished by means of deformable and/or breakable fasteners. These deformable and/or breakable fasteners in this case are designed such that normal load conditions such as wind loads or forces introduced for opening and closing can be absorbed reliably. A load exceeding normal load conditions results in failure of the fasteners. This failure can result in a deformation or even a destruction of the fasteners in this case, and thus in a movability or even deformability of the hood, which advantageously makes it possible to absorb energy, such as the impact energy of a pedestrian.

The deformability or the defined failure of the fasteners is realized here through the choice of material and the design of the fasteners, for example. Thus, the fasteners can have a predetermined breaking point and/or be made of a material that fails at a specific load, for example.

A structure that absorbs the collision energy can advantageously be provided in this way for the load case of a collision, in particular with a pedestrian, by means of the failure or deformation of the fasteners. This structure can absorb impact energy, and thus protect pedestrians from injury.

The fasteners can be made of plastic, steel, or aluminum in this design. These materials can be adjusted advantageously well for load limit and are durable.

The latch element can be connected to the latch support bar by means of deformable and/or breakable components. This advantageously makes it possible to further improve the deformability of the hood in the case of a collision, and thus the pedestrian protection.

The latch element itself can be a deformable and/or breakable component. As a result, assembly costs can advantageously be reduced.

The motor vehicle according to the invention has a hood according to the invention.

The various embodiments of the invention cited in this application can be combined with one another to good advantage unless otherwise stated in the individual case.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
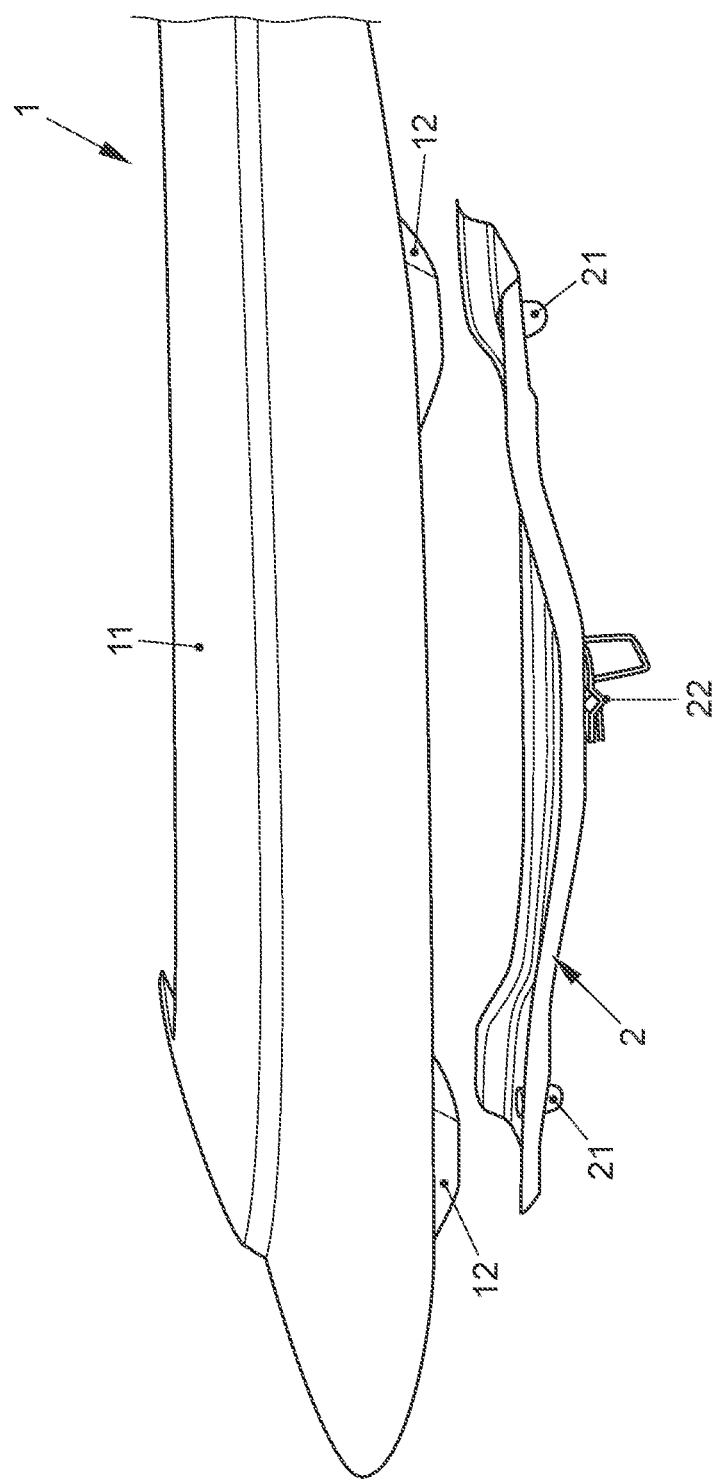
FIG. 1 shows a hood of a vehicle and a latch support bar.

FIG. 1 shows the hood 1 of an automobile with an outer skin 11 and a latch support bar 2. Latch support bar 2 and hood 1 are not yet connected. The hood 1 has two fastening points 12, at which the latch support bar 2 is fastened. The latch support bar 2 has two bumpers 21. The latch support bar 2 has a latch element 22 centered between the two bumpers 21. In the closed state of the hood 1, the latch support bar 2 is fixed in position by the latch element 22 and the bumpers 21.

The bumpers 21 are arranged in the end regions of the latch support bar 2. The latch support bar 2 is shaped such that there is an evident distance between the outer skin 11 of the hood 1 and the latch support bar 2, in the region of the latch element 22, between the bumpers 21.

Figure 2:
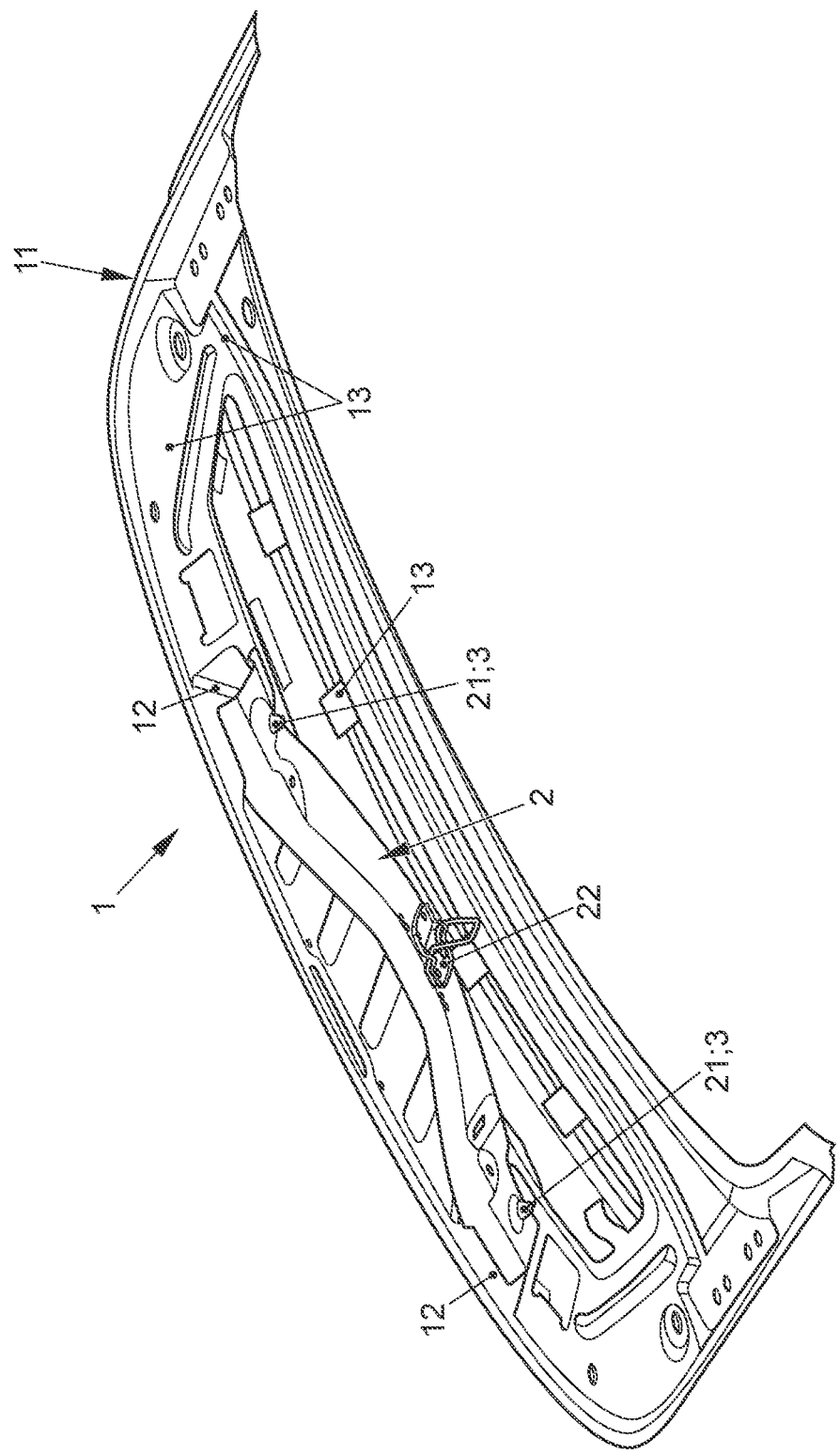
FIG. 2 is a view of the inner side of a hood with latch support bar.

FIG. 2 shows the inner side of the hood 1. On the inside, the hood 1 has reinforcing elements 13. These elements are integrally connected to the outer skin 11 by welding. The latch support bar 2 is fastened to the fastening points 12 of the hood 1 by fasteners 3, which are arranged in the bumpers 21.

The reinforcing elements 13 are designed to be weaker in the region between the latch support bar 2 in order to permit good deformability of the outer skin 11 of the hood 1 in this region.

The invention being thus described, it will be obvious that the same may be varied in many ways. Such variations are not to be regarded as a departure from the spirit and scope of the invention, and all such modifications as would be obvious to one skilled in the art are to be included within the scope of the following claims

What is claimed is:

1. A hood for a vehicle, the hood comprising:
a latch support bar that extends transversely to a longitudinal direction of the vehicle;
a plurality of reinforcing elements connected to an underside of the hood having variable deformability, each reinforcing element of the plurality of reinforcing elements that are provided within a latch support bar region has higher deformability than each reinforcing element of the plurality of reinforcing elements that are provided outside the latch support bar region,
a latch element,
wherein the latch support bar is connected to the hood by at least two fastening points that are arranged at a distance from one another, and
wherein the latch support bar is connected to the hood via at least one deformable fastener.

2. The hood according to claim 1, wherein the fasteners are made of plastic, steel, or aluminum.

3. The hood according to claim 1, wherein a distance between the at least two fastening points is at least one third of the total width of the hood.

4. The hood according to claim 1, wherein the latch element is connected to the latch support bar via deformable and/or breakable fasteners.

5. The hood according to claim 1, wherein the latch element is a deformable and/or a breakable component.

6. The hood according to claim 1, wherein the latch support bar is spaced apart from the hood in a region.

7. The hood according to claim 1, wherein the latch support bar has at least one predetermined breaking point.

8. The hood according to claim 1, wherein the latch support bar has bumpers for a connection with the vehicle.

9. A motor vehicle comprising a hood according to claim 1.

10. The hood according to claim 1, wherein the latch support bar is arranged symmetrically with respect to an outer skin of the hood.

11. The hood according to claim 1, wherein the latch support bar comprises snubbers for the connection with the vehicle.

12. The hood according to claim 1, wherein the at least one deformable fastener is breakable.

13. The hood according to claim 1, wherein the latch support bar is connected to the hood via a plurality of deformable and breakable fasteners.

\* \* \* \* \*